US009697271B2

(12) United States Patent
Riyaz

(10) Patent No.: US 9,697,271 B2
(45) Date of Patent: Jul. 4, 2017

(54) BUSINESS INTELLIGENCE REPORTS WITH NAVIGABLE REFERENCE INDICATORS

(71) Applicant: Tata Consultancy Services Limited, Mumbai (IN)

(72) Inventor: Malukanparampil Meer Mohammed Riyaz, Kakkanad (IN)

(73) Assignee: Tata Consultancy Services Limited, Mumbai (IN)

( * ) Notice: Subject to any disclaimer, the term of this patent is extended or adjusted under 35 U.S.C. 154(b) by 701 days.

(21) Appl. No.: 14/183,017

(22) Filed: Feb. 18, 2014

(65) Prior Publication Data

US 2014/0258210 A1  Sep. 11, 2014

(30) Foreign Application Priority Data

Mar. 6, 2013 (IN) ............................. 687/MUM/2013

(51) Int. Cl.
*G06F 17/30* (2006.01)
*G06Q 10/10* (2012.01)
*G06Q 10/06* (2012.01)

(52) U.S. Cl.
CPC .. *G06F 17/30592* (2013.01); *G06F 17/30563* (2013.01); *G06Q 10/06393* (2013.01); *G06Q 10/10* (2013.01)

(58) Field of Classification Search
CPC ......... G06F 17/30563; G06F 17/30592; G06F 17/243; G06F 3/04812
USPC .......................... 707/602; 705/7.29; 715/760
See application file for complete search history.

(56) References Cited

U.S. PATENT DOCUMENTS

| | | | | |
|---|---|---|---|---|
| 5,692,181 | A | * | 11/1997 | Anand .............. G06F 17/30592 707/714 |
| 5,848,410 | A | * | 12/1998 | Walls ................ G06F 17/30722 707/669 |
| 6,539,405 | B1 | | 3/2003 | Honig |
| 7,031,958 | B2 | * | 4/2006 | Santosuosso ..... G06F 17/30463 707/669 |
| 7,349,862 | B2 | | 3/2008 | Palmer et al. |

(Continued)

FOREIGN PATENT DOCUMENTS

EP           0 094 516    11/1983

*Primary Examiner* — Shahid Alam
(74) *Attorney, Agent, or Firm* — Schwegman, Lundberg & Woessner, P.A.

(57) ABSTRACT

The present subject matter relates to generation of business intelligence reports with navigable reference indicators. The method comprises obtaining information from an information source for providing in a business intelligence report. Further, report parameters are obtained through a user interface, wherein the report parameters include at least notes and indicator parameters. The notes and indicator parameters indicate a plurality of navigable reference indicators to be included in the business intelligence report. The method further comprises mapping the notes and indicator parameters with the obtained information. Based on the mapping, the business intelligence report is generated with the plurality of navigable reference indicators. Further, the plurality of navigable reference indicators provides a forward and backward link between two or more sections of the business intelligence report.

13 Claims, 6 Drawing Sheets

(56) References Cited

U.S. PATENT DOCUMENTS

| | | | |
|---|---|---|---|
| 7,925,985 B2 * | 4/2011 | Moore | G05B 23/0267 |
| | | | 715/772 |
| 2003/0004742 A1 * | 1/2003 | Palmer | G06F 17/243 |
| | | | 705/7.29 |
| 2007/0239508 A1 * | 10/2007 | Fazal | G06Q 10/0637 |
| | | | 705/7.36 |
| 2010/0121888 A1 | 5/2010 | Cutting et al. | |
| 2011/0087974 A1 * | 4/2011 | Kulas | G06F 3/04812 |
| | | | 715/760 |

* cited by examiner

REPORT TITLE
Sub Title to Describe the Report
Prompt values selected and data date

| Dim 1 | Dim 2 | Value 1 | Value 2 | Value 3 |
|---|---|---|---|---|
| P0 a/ | ABC | 100.00 | 178.03 | 45.76 |
|  | BCD b/ | b/ 160.00 | 278.03 | 145.76 |
|  | CDE | 170.00 | 100.03 | 65.76 |
| P1 c/ | ABC | 200.00 | 178.03 | 345.76 |
|  | CDE | 100.00 | 178.03 | 45.76 |
|  | BCD | 160.00 | 278.03 | 145.76 |
|  | CDE | 170.00 | 100.03 | 65.76 |

Notes
a/ Includes shares that categorized under portfolio path P0 [1]
b/ Value calculated as weighted average from total P0 value1 [1],[2]
c/ Includes shares that categorized under portfolio path P1 [1]

Fig. 1(e)

BUSINESS INTELLIGENCE REPORTS WITH NAVIGABLE REFERENCE INDICATORS

CLAIM OF PRIORITY

This application claims the benefit of priority of Indian Patent Application Serial No. 687/MUM/2013, entitled "BUSINESS INTELLIGENCE REPORTS WITH NAVIGABLE REFERENCE INDICATORS," filed on Mar. 6, 2013, the benefit of priority of which is claimed hereby, and which is incorporated by reference herein in its entirety.

TECHNICAL FIELD

The present subject matter, in general, relates to business intelligence reports and, in particular, relates to method(s) and system(s) for implementing navigable reference indicators in business intelligence reports.

BACKGROUND

Nowadays, with rapidly changing industry trends and fierce competition, it becomes important for organizations to establish or maintain their position in the industry. In order to withstand the immense competition in the industry, it is important to stay abreast with status of the industry and various industry norms. In the present context, a field known as business intelligence, also referred to as "BI", has gained widespread popularity. Various organizations rely on business intelligence to understand and effectively manage the factors that drive an enterprise. Business intelligence generally refers to a category of systems and applications used to facilitate a business enterprise in decision making and governance.

Business intelligence may include techniques used in identifying, obtaining, extracting, and analyzing business data. Such business data can include historical data, current data, and predictive data, for a business. Such business data may include information, such as shares, price of a product, and sales record. Further, business intelligence techniques may include transforming raw data relating to the industry into useful information for the further analysis. The transformed data is collated and presented in form of a report, usually referred to as business intelligence reports, for reporting and analysis.

SUMMARY

This summary is provided to introduce concepts related to generation of business intelligence reports with navigable reference indicators, and the concepts are further described below in the detailed description. This summary is not intended to identify essential features of the claimed subject matter nor is it intended for use in determining or limiting the scope of the claimed subject matter.

In one implementation, the present subject matter relates to a computer implemented method for generation of business intelligence reports with navigable reference indicators. The method comprises obtaining information from an information source. for providing in a business intelligence report. The report parameters are obtained through a user interface. Further, the report parameters may include at least notes and indicator parameters. The notes and indicator parameters indicate a plurality of navigable reference indicators to be included in the business intelligence report. Further, the notes and indicator parameters are mapped with the obtained information. Based on the mapping, the business intelligence report is generated with the plurality of navigable reference indicators. The plurality of navigable reference indicators provides a forward and backward link between two or more sections of the business intelligence report.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 1(e) illustrates a representation of Business intelligence report with navigable reference indicators, according to one embodiment of the present subject matter.

DETAILED DESCRIPTION

Figure 1A:
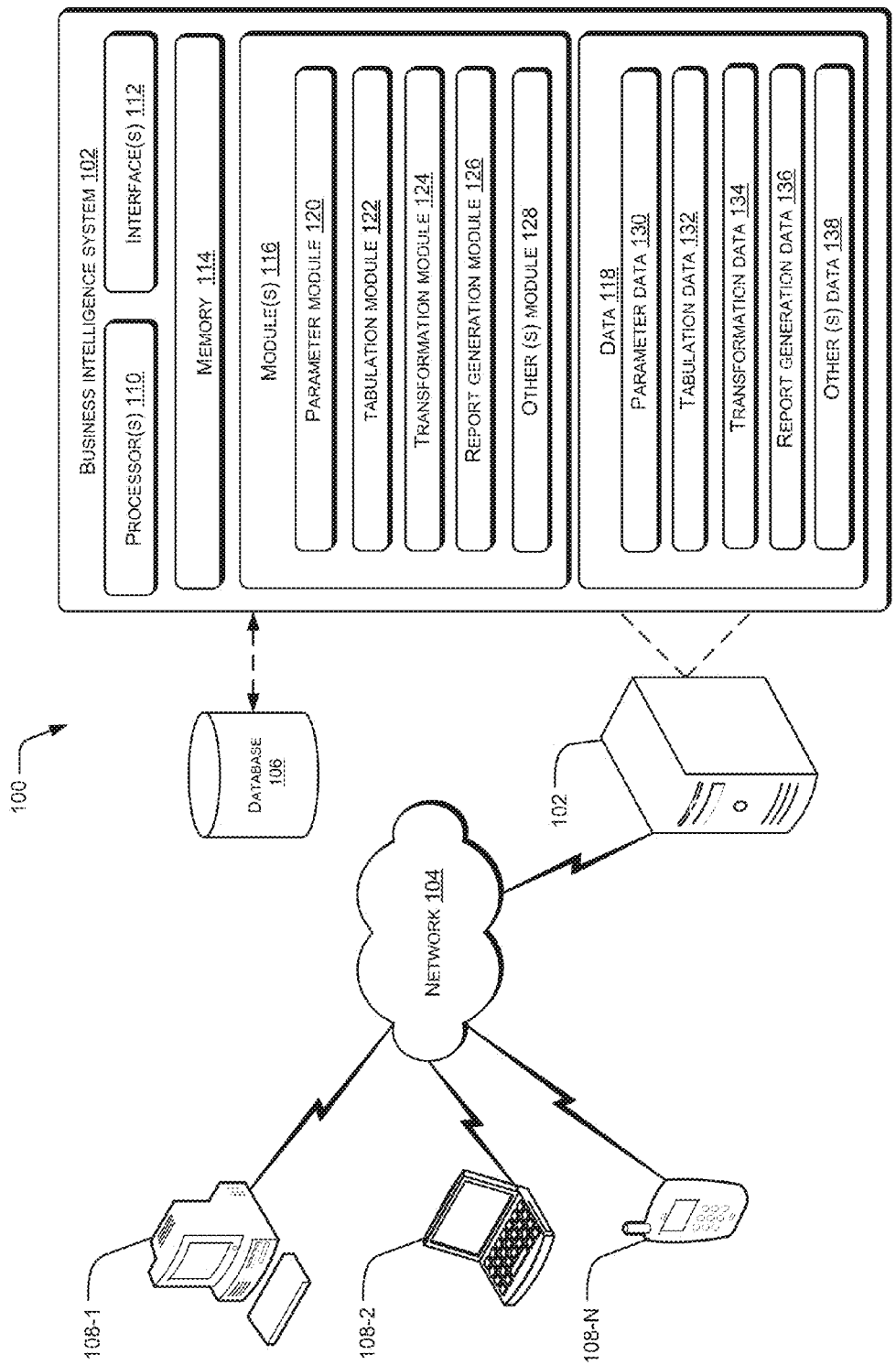
FIG. 1(a) illustrates a network environment implementing a business intelligence system, in accordance with an embodiment of the present subject matter.
Figure 1B:
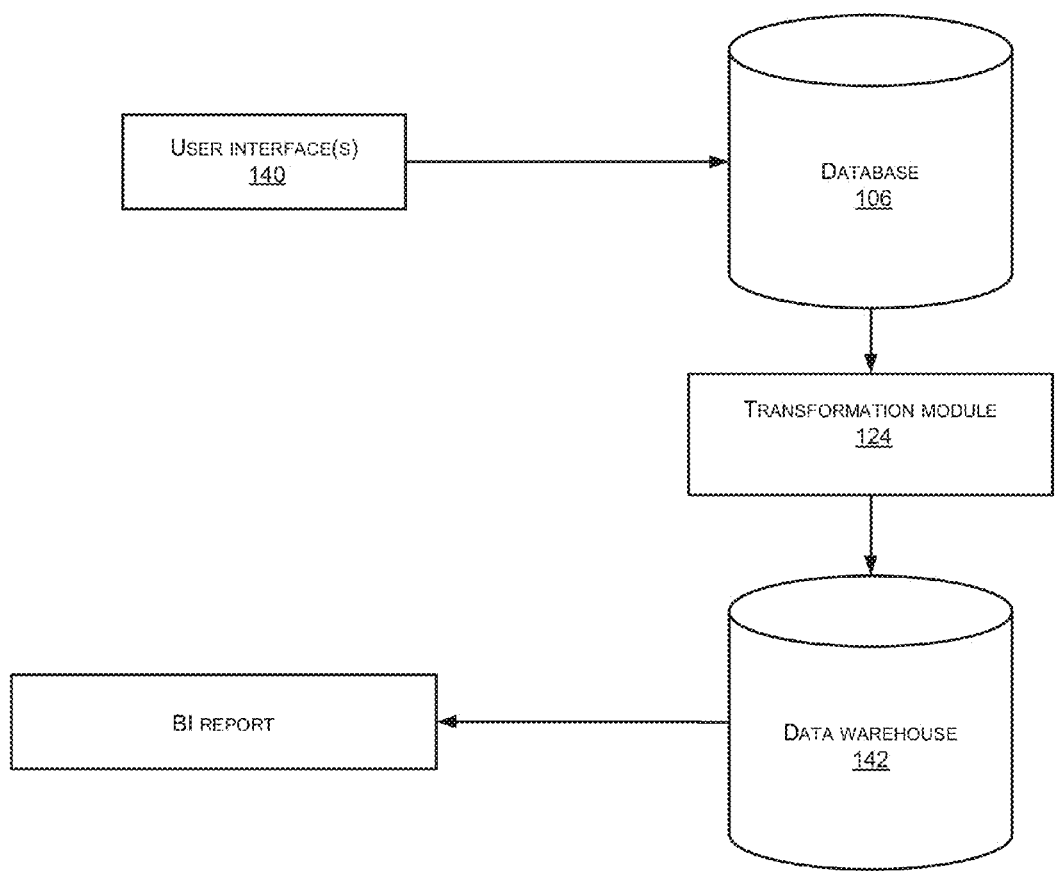
FIG. 1(b) illustrates a representation of a Reference Indicators with Report Notes model for business intelligence reports, in accordance with an embodiment of the present subject matter.
Figure 1C:
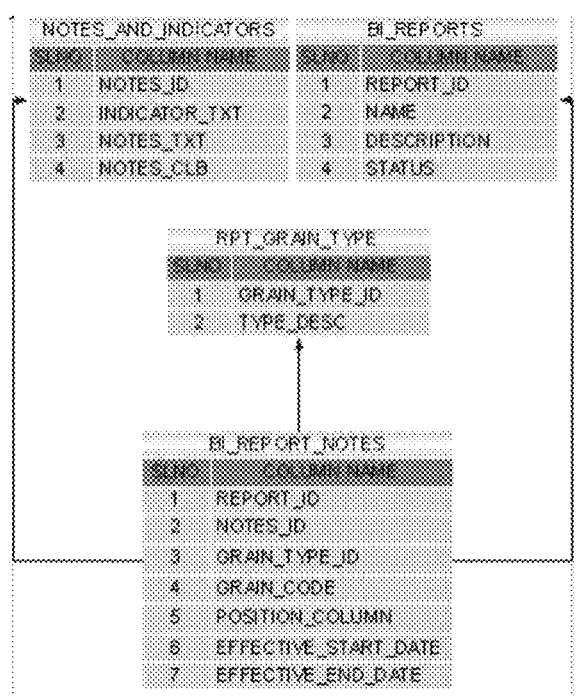
FIG. 1(c) illustrates a representation of a plurality of database tables, in accordance with an embodiment of the present subject matter.
Figure 1D:
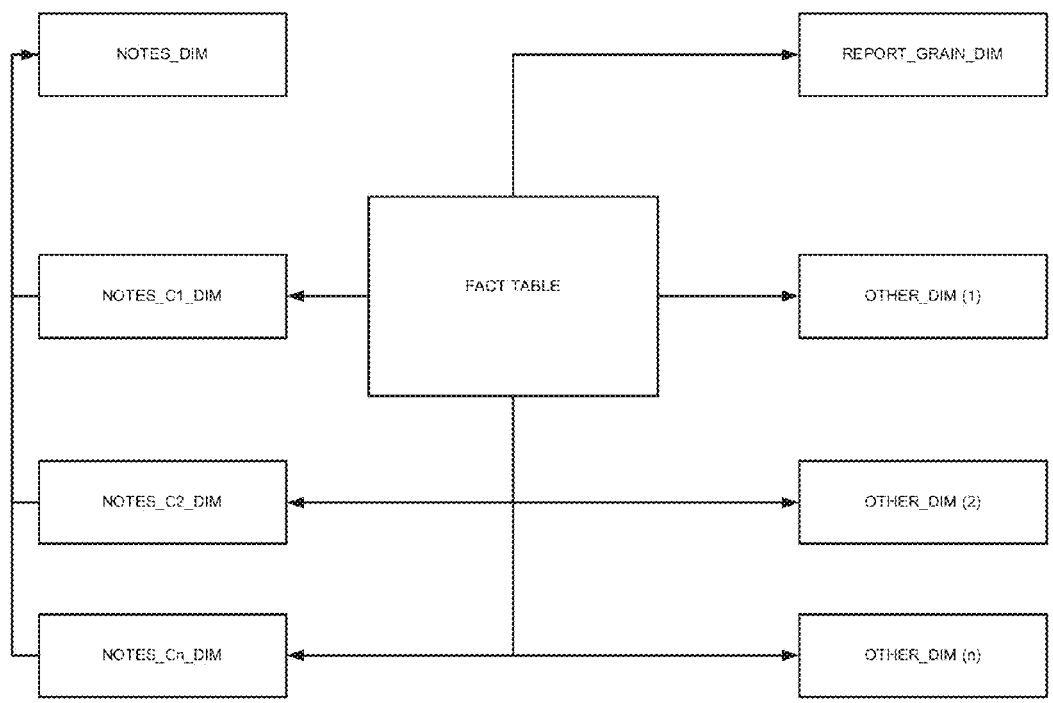
FIG. 1(d) illustrates a representation of a fact table and a plurality of dimension tables in a star schema configuration, in accordance with an embodiment of the present subject matter.

System(s) and method(s) for generating business intelligence reports with navigable reference indicators are provided. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

In recent times, worldwide economic growth has resulted into an immensely competitive industrial environment. From a consumer's perspective, the competitive industrial environment is beneficial as it ensures continuous developments in an industry and subsequently, quality products to the consumers. On the other hand, it becomes important for organizations from different fields to take cognizance of the growing challenges in establishing and retaining their position in the industry. Therefore, it is pertinent for the organizations to understand and adapt the dynamics of rapidly changing industry.

To survive the continuously changing industry standards, most of the organizations invest considerable amount of capital in market analysis. Analysis of the market ensures that the organization is updated and equipped with latest technologies and trends pertinent to their industry. For market analysis, business intelligence techniques are generally employed. Such techniques represent the tools and systems that play a substantial role in strategic planning of the organization. Using business intelligence techniques, information which may be considered relevant for growth and development of an organization is extracted and analyzed. For example, the information may include historical data, current data, and predictive data based on current industry trends. Such information may include, but is not limited to shares, price of a product, and sales record. Therefore, business intelligence techniques can include a set of methodologies, processes, architectures, and technologies that transform raw data into meaningful and useful information.

The information provided by the business intelligence techniques may assist in identifying and developing new opportunities for an organization. By utilizing these opportunities and thereby implementing an effective strategy, organizations can secure a long-term stability in the industry. Further, business intelligence allows the organizations to make well informed decisions for the development and growth of the organization. Therefore, business intelligence equips an organization for proactive work management.

Based on the requirements of an organization, a report (hereinafter referred to as BI report) may be generated providing information relevant for the growth and development of the organization. For example, if an organization wants to launch a new production unit, the organization may want to generate a BI report including details pertaining to sales record of their products in different regions, manpower available in different regions, real estate scenario, etc. The BI reports may include a number of measures or values in different sections of the report. For example, if the report is in a spreadsheet sheet, the report can include hundreds of values in different columns and rows.

Generally, notes may be provided in BI reports to provide additional information about different aspects, say measures or values in the report. For example, a value, with which additional information needs to be provided, may be provided or marked with a numerical digit "X". To get the additional information, a reader has to refer to a note corresponding to the numerical digit "X". Further, in one example, the additional information may include calculations which lead to the deduction of the marked or value.

Furthermore, the notes may be provided at different places in a BI report. In certain cases, the notes can be provided as footnotes. But, in case of footnotes, layout of the main text gets affected as the footnotes may cover a significant portion of each sheet or page of the BI report. Therefore, in certain other cases, the notes can be provided under a separate heading at the end of a document, i.e., in the form of endnotes. However, in case of endnotes, it may be inconvenient for a reader to refer to endnotes corresponding to different values of the report as the reader has to continuously move back and forth between the main text and the endnotes. Therefore, continuously moving up and down the BI report may disrupt the continuity of the reader. This problem becomes more prominent in case of large BI reports, for example, BI reports including hundreds of pages.

In addition, in case of large BI reports, after referring to the notes provided at the end of the BI report, it becomes difficult for the reader to trace back the value from where the reader referred to the note. In some cases, different values may have a common note. For example, if principle behind the calculation which leads to the deduction of the different values is same, all such values may be provided with a common note. The common notes make it more difficult for the reader to trace back the value from where the reader referred to the corresponding common note, as it becomes inconvenient to identify the actual value out of a plurality of values referring to the common note. Therefore, the conventional Business Intelligence techniques lack BI reports in which notes can be referred by a reader conveniently.

Further, based on a change in the requirements of an organization, the information available in data warehouse may also get changed. Subsequently, notes defined for the BI report may not remain applicable for the new BI report. Therefore, the user may have to redefine the notes as may be appropriate for the new BI report. This causes inconvenience to the user as the user may have to redefine the notes from the beginning to correspond to changes in the BI report.

According to the present subject matter, a description of business intelligence (BI) system for generating business intelligence reports with navigable reference indicators, hereinafter referred to as BI system, is provided. In one implementation, the BI system may obtain and analyze information available from an information source. Further, the information source may include different sources, such as various software applications, external databases, and online portals. Furthermore, an administrator associated with an organization may provide a plurality of report parameters to the BI system. The information received from the information source and the plurality of report parameters may be utilized to generate a Business Intelligence report, hereinafter referred to as BI report, with navigable reference indicators.

In one implementation, the navigable reference indicators may be provided as a forward and backward link between two or more sections of the BI report. In another implementation, the forward link can be provided at one or more values in main text of a BI report to refer a reader to a corresponding note. Further, a backward link or a return link provided with a plurality of notes may refer the reader to the corresponding value in the BI report from where the reader initially referred the corresponding note. In one implementation, the notes and reference indicators may be defined on the basis of a grain of a BI report. Therefore, the navigable reference indicators may automatically get updated and repositioned based on any change in data available in a fact table.

Furthermore, the plurality of report parameters may be stored in a database. The data from the database may be transformed and stored in form of at least one fact table and at least one dimension table in a data warehouse. Continuing with the present implementation, the at least one fact table may be populated by the information obtained from the information source for the generation of the BI report, based on predefined metadata rules. Further, based on the mapping of the at least one dimension table with the at least one fact table, a BI report with navigable reference indicators may be generated.

As mentioned earlier, a plurality of report parameters may be provided to the BI system. In one implementation, the report parameters may include, but are not limited to notes and indicator parameters, grain parameters, and report note mapping parameters. The notes and indicator parameters may relate to details pertaining to a plurality of notes and navigable reference indicators to be implemented in a plurality of BI reports.

Further, the grain parameters may relate to masters and grain types for the plurality of BI reports. A grain type, or grain, may be understood as a level of details provided in a BI report. Further, a collection of reference information about a measurable event is known as dimensions. Dimensions categorize and describe facts and measures in ways that support meaningful answers to business questions. For example, for generation of a BI report for worldwide population, "location" may be selected as a dimension for the BI report. Further, the dimension "location" may have different levels, such as Continent, Country, State, and District. If a user wants to generate a BI report on a State level, the data available in the BI report may be on state level and therefore, grain of the BI report is "State". As would be understood, grain is a level of dimension based on which the data in the BI report may be provided. Furthermore, the report note mapping parameters assist in mapping the plurality of notes with the plurality of BI reports.

Subsequent to providing the report parameters to the BI system, the report parameters may be categorized and arranged into a plurality of tables in database. In one implementation, the plurality of tables may include, but are not limited to BI Report table, notes and indicator table, grain table, and report notes table. The BI report table includes details pertaining to a plurality of BI reports. In other words, the BI report table may be understood as master table of the plurality of BI reports.

Further, the notes and indicator table includes data stored as notes and indicator parameters. In other words, the notes and indicator table includes a plurality of notes and a plurality of navigable reference indicators which may be implemented in the plurality of BI reports. In addition, the grain table includes data stored as grain parameters through the user interface. In other words, the grain table includes a plurality of grain types or masters which may be used to map different notes and navigable reference indicators with the BI reports.

Continuing with the present implementation, the report note mapping table includes data stored as report note mapping parameters through the user interface. In one implementation, the report note mapping table includes the unique ID allotted to the plurality of BI reports, grain types, grain codes, and position or column corresponding to the plurality of notes. In other words, the plurality of notes may be mapped with respect to the details provided for generation of the BI reports.

Further, data available in a database or extracted from external sources for generation of the BI reports may be transformed in different formats based on the requirements of an organization generating the BI report. According to an implementation of the present subject matter, after the transformation process, the data from the plurality of the database tables may be provided to the data warehouse in the form of at least one fact table and at least one dimension table.

In an implementation, the fact table can include measures, values or facts of a business process. Further, the fact table may be surrounded by a plurality of dimension tables in a star schema configuration. The values in the at least one fact table and the at least one dimension table may be provided based on predefined metadata rules. In one implementation, the plurality of dimension tables may include, but are not limited to a dimension table for notes, referred to as a notes dimension table, and the corresponding reference indicators, and a dimension table for report grains.

In an example, the data for the notes dimension table may be obtained from the notes and indicator table in the database. For instance, the notes dimension table may include a filter for filtering the data corresponding to different columns. Therefore, in said example, the notes dimension table may further be categorized in a plurality of dimension tables corresponding to each column of the BI report. Continuing with the present implementation, each row in the plurality of dimension tables, corresponding to each column of the BI report, may have a corresponding row in the notes dimension table. Similarly, each row in the notes dimension table may have zero or more corresponding rows in at least one of the plurality of dimension tables corresponding to each column.

In yet another implementation, each row in the plurality of dimension tables corresponding to each column may have zero or more corresponding rows in the fact table. Similarly, each row in the fact table may have at most one corresponding row in at least one of the plurality of dimension tables corresponding to each column.

Further, each row in the grain dimension table may have at least one corresponding row in the fact table. On the other hand, each row in the fact table may have only one corresponding row in the grain dimension table.

Continuing with the present implementation, the BI reports can be generated in different formats, such as graphs, curves, spreadsheets sheets, slide shows, and text documents. Further, the plurality of navigable reference indicators for different notes may be provided in the BI report based on the notes dimension for different columns. In one implementation, the navigable reference indicators may be provided as at least one of a super-script text, a sub-script text, and a normal text. Further, text for the navigable reference indicators may also be defined by the notes dimension of the corresponding column.

In said implementation, the navigable reference indicators can be provided as a forward link and a backward link between two or more sections of the BI report. In one implementation, the forward link provided at different location in the text of the report, may guide or refer a reader to a corresponding note in notes section, say the footnotes section or the endnotes section. Further, in an implementation, at least one backward link or return link may also be provided with each of the plurality of notes in the notes section. The return links provided with the plurality of notes may refer the reader to the corresponding value in the BI report from where the reader initially referred the corresponding note. Furthermore, in case, when a plurality of values in the main text of the BI report may have a common note, then the forward links provided with the plurality of values may refer the reader to a corresponding common note. On the other hand, a plurality of return links corresponding to the plurality of the values may be provided with the corresponding common note. Therefore, the reader may have to click on one of the plurality of return links to refer to a specific corresponding value.

Therefore, by providing navigable reference indicators with different values in the BI report, and with the notes in the notes section for referring back to the value from where the reader referred to the corresponding note, time spent in referring the note may be minimized. Further, the inconvenience caused in tracing back the corresponding value may also be avoided.

As mentioned previously, notes and navigable reference indicators are defined on the basis of grain of a BI report. Therefore, notes can be predefined in the BI system. Subsequently, in case of any change in the data contained in the fact table, e.g., the grain of a BI report is changed; navigable reference indicators provided in the existing BI report may automatically get updated and repositioned. This results into minimization of the time spent by a user in redefining notes for a BI report based on the changes in fact table, thereby ensuring convenience to the user.

These and other advantages of the present subject matter would be described in greater detail in conjunction with the following figures. While aspects of described system(s) and method(s) for generating Business Intelligence reports with navigable reference indicators can be implemented in any number of different computing systems, environments, and/or configurations, the embodiments are described in the context of the following exemplary system(s).

FIG. 1(a) illustrates a network environment 100 implementing a Business Intelligence system 102 (also referred to as, BI system 102), according to an embodiment of the present subject matter. In the network environment 100, the BI system 102 is connected to a network 104. Further, the BI system 102 is connected to a database 106. Additionally, the network environment 100 includes one or more client devices 108-1, 108-2 . . . 108-N, collectively referred to as client devices 108 and individually referred to as client device 108, connected to the network 104. In one implementation, the client device 108 may be used to run registered processes that are monitored by the BI system 102. In another implementation, the client device 108 may be used to view the logs pertaining to the execution of the registered processes. In yet another implementation, the client device 108 may be used for both purposes.

The BI system 102 can be implemented as any set of computing devices connected to the network 104. For instance, the BI system 102 may be implemented as workstations, personal computers, desktop computers, multiprocessor systems, laptops, network computers, minicomputers, servers, and the like. In addition, the BI system 102 may include multiple servers to perform mirrored tasks for users.

Furthermore, the BI system 102 can be connected to the client devices 108 through the network 104. Examples of the client devices 108 include, but are not limited to personal computers, desktop computers, smart phones, PDAs, and laptops. Communication links between the client devices 108 and the BI system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the BI system 102 and the client devices 108. The network devices within the network 104 may interact with the BI system 102 and the client devices 108 through communication links.

In said embodiment, the BI system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the BI system 102 to communicate with other computing devices, such as web servers, and external data repositories, such as the database 106, in the network environment 100. The interfaces 112 may facilitate multiple communications within a wide variety of protocols and networks, such as a network, including wired networks, e.g., LAN, cable, etc., and wireless networks, e.g., WLAN, cellular, satellite, etc. The interfaces 112 may include one or more ports for connecting the BI system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal. The memory 114 also includes module(s) 116 and data 118.

The module(s) 116 include routines, programs, objects, components, data structures, etc., which perform particular tasks or implement particular abstract data types. In one implementation, the module(s) 116 includes a parameter module 120, a tabulation module 122, a transformation module 124, a report generation module 126, and other module(s) 128. The other module(s) 128 may include programs or coded instructions that supplement applications and functions of the BI system 102.

On the other hand, the data 118, inter alia serves as a repository for storing data processed, received, and generated by one or more of the module(s) 116. The data 118 includes, for example, a parameter data 130, a tabulation data 132, a transformation data 134, a report generation data 136, and other data 138. The other data 138 includes data generated as a result of the execution of one or more modules in the module(s) 116.

In one implementation, the BI system 102 may be configured to generate Business Intelligence reports with navigable reference indicators. The BI system 102 may obtain information available from an information source. The information source may include different sources, such as various software applications, external databases, and online portals. For example, an automobile company may obtain and analyze information such as sales record of different models available in the market before launching a product. In one implementation, the parameter module 120 may be configured to receive a plurality of report parameters. In one example, a user may provide the report parameters through a user interface(s). Further, the user may be an administrator associated with an organization. The plurality of report parameters may include, but are not limited to notes and indicators parameters, grain parameters, and report note mapping parameters. In one implementation, the notes and indicator parameters may be mapped with the obtained information for generation of a business intelligence report with navigable reference indicators.

Further, the notes and indicator parameters may include details pertinent to notes and navigable reference indicators to be implemented in a plurality of BI reports, such as unique ID for each of the notes and the navigable reference indicators, text to be provided as note and navigable reference indicators, and language of the text. Further, in one implementation, a Character Large Object (CLOB) field may be provided to store large notes or notes which include custom formatting, e.g., XHML tags. As would be appreciated by a person skilled in the art, the CLOB field is a data type which can offer high size limits, as compared to other data types.

Similarly, the grain parameters may include details pertaining to masters or grain types corresponding to the plurality of BI reports. In one implementation, the grain parameters may include, but are not limited to type of grain for generating the BI report, a unique ID for each grain type, and description of each grain. In another implementation, the notes and indicator parameters may be defined based on the grain type selected for generating a BI report.

Further, report note mapping parameters assist in mapping a plurality of notes with the plurality of BI reports. The report note mapping parameters may define at least one of the plurality of BI reports, a grain type, a grain code, and a column or position for each of the plurality of notes. Therefore, the report note mapping parameters define a corresponding BI report, grain type, grain code, and position for different notes. In one example, the parameter module 120 may be configured to store information concerning the report parameters in the parameter data 130.

In another implementation, the tabulation module 122 may be configured to generate a plurality of database tables based on the report parameters received by the parameter module 120. The plurality of database tables may include, but are not limited to a BI report table, a notes and indicator table, a grain table, and a report notes table. Further, the BI report table includes details pertaining to a plurality of BI reports. For example, in one implementation, the BI report table may include description, status, and technical field of the BI reports. Further, in the BI report table, a unique ID number allotted to each BI report may act as a primary key.

Furthermore, the tabulation module 122 may be configured to store and tabulate data pertaining to the notes and indicator parameters in the notes and indicator table. In other words, the notes and indicator table includes details pertaining to a plurality of notes and a plurality of navigable reference indicators which may be implemented in the plurality of BI reports. Therefore, the notes and indicator table may be considered as a master sheet or master table of all the notes and navigable reference indicators to be implemented in the plurality of BI reports. In one implementation, the unique ID allotted to each note as the report parameters, may be considered as primary key for the Notes and Indicator table.

In one implementation, the tabulation module 122 may be configured to store the data pertaining to the grain parameters in the grain table. Therefore, the grain table includes a plurality of grain types or masters which may be used to map different notes and navigable reference indicators with the BI reports. Therefore, the grain table may be considered as a master sheet or master table of all types of grains to be implemented in different reports. In one implementation, the unique ID allotted to each grain as the grain parameters, may be considered as primary key for the grain table.

In another implementation, the tabulation module 122 may be configured to store the data pertaining to the report note mapping parameters in the report note mapping table. Continuing with the present implementation, the report note mapping table may include the unique ID allotted to the plurality of BI reports, grain types, grain codes, and position or column corresponding to the plurality of notes. Further, the tabulation module 122 may be configured to provide historical information of the plurality of notes in the report note mapping table.

In addition, the tabulation module 122 may be configured to provide an effective start date and an effective end date for each of the plurality of navigable reference indicators provided with different values, for referring to the plurality of the notes in a BI report. Therefore, the navigable reference indicators may be provided with a value for a predefined time period based on the user preference. For example, if a user prefers to provide a reference indicator with a value for a specific period of time, the BI system 102 allows the user to define the period. In one example, the tabulation module 122 may be configured to store information concerning the tabulation of the data pertaining to the report parameters in the tabulation data 132.

Once the tabulation module 122 generates a plurality of database tables, the transformation module 124 may be configured to transform the data available in the database tables based on the requirements of an organization. In one implementation, the data in the plurality of database tables may be transformed by an Extraction, Transformation, and Loading (hereinafter referred to as ETL) process. In the ETL process, data is extracted from the database, transformed based on the requirements of an organization and subsequently, loaded in a data warehouse.

In one implementation, transformation module 124 may further be configured to provide the transformed data in form of fact tables and a plurality of dimension tables arranged in a star schema configuration in the data warehouse. Further, values in the fact table and the plurality of dimension tables may be provided based on predefined metadata rules. In another implementation, the plurality of dimension tables may include, but are not limited to a dimension table for notes and the corresponding navigable reference indicators (hereinafter referred to as Notes_Dim), and a dimension table for report grains (hereinafter referred to as Report_Grain_Dimension). Further, unique ID provided to each of the plurality of notes may act as a surrogate key for the Notes_Dim.

In a further implementation, the transformation module 124 may be configured to provide a filter for the Notes_Dim for filtering the data corresponding to different columns. Therefore, the Notes_Dim may further be categorized in a plurality of dimension tables, such as Notes_$C_1$_Dim, Notes_$C_2$_Dim, . . . Notes_$C_n$_Dim corresponding to each column of the BI report. As would be understood, Notes_$C_1$_Dim, Notes_$C_2$_Dim, . . . Notes_$C_n$_Dim are subsets of Notes_Dim.

In a further implementation, each row in Notes_$C_1$_Dim, Notes_$C_2$_Dim, . . . Notes_$C_n$_Dim may have a corresponding row in Notes_Dim. Therefore, the cardinality ratio of number of rows of each of Notes_$C_1$_Dim, Notes_$C_2$_Dim, . . . Notes_$C_n$_Dim corresponding to the rows of Notes_Dim is 1:1. Similarly, each row in Notes_Dim may have zero or more corresponding rows in at least one of the Notes_$C_1$_Dim, Notes_$C_2$_Dim, . . . Notes_$C_n$_Dim.

In yet another implementation, each row in Notes_$C_1$_Dim, Notes_$C_2$_Dim, . . . Notes_$C_n$_Dim may have zero or more corresponding rows in the fact table. Similarly, each row in the fact table may have at most one corresponding row in at least one of the Notes_$C_1$_Dim, Notes_$C_2$_Dim, . . . Notes_$C_n$_Dim.

Further, each row in Report_Grain_Dim may have at least one corresponding row in the fact table. On the other hand, each row in the fact table may have only one corresponding row in the Report_Grain_Dim. In one example, the transformation module 124 may be configured to store information pertaining to the transformation of the data in the transformation data 134.

Continuing with the present implementation, once the data is transformed in the form of fact tables and the plurality of dimension tables by the transformation module 124, the report generation module 126 may be configured to generate a BI report with navigable reference indicators based on report parameters provided by an organization.

The report generation module 126 may be configured to generate the BI report with navigable reference indicators based on the notes dimension for different columns. In one implementation, the report generation module 126 may be configured to provide the navigable reference indicators as at least one of a super-script text, a sub-script text, and a normal text.

In another implementation, the report generation module 126 may be configured to provide navigable reference indicators in form of a forward link and a backward link between two or more sections of the BI report. In one implementation, the forward link may be provided as a URL link. The URL link of the navigable reference indicators provided at different values may guide or refer a reader to a corresponding note in notes section. Similarly, the report generation module 126 may further be configured to provide at least one backward link or return link with each of the plurality of notes in the notes section. Therefore, by providing a forward link with a plurality of values in the BI report, and backward links with the notes in the notes section for referring back to the value from where the reader referred to the corresponding note, time spent in referring the note may be minimized. Further, the inconvenience caused in tracing back the corresponding value may also be avoided.

In one implementation, the data to be populated in the fact table may be based on a grain defined for a BI report. In other words, information to be provided in the BI report may be based on the grain. Subsequently, based on any change in the grain of the BI report, the level of information provided in the BI report may be changed. Further, as mentioned earlier, the notes and navigable reference indicators are defined on the basis of grain of the report. Therefore, the report generation module 126 may be configured to automatically update and reposition the navigable reference indicators provided in the existing BI report corresponding to any change in the grain of the BI report. Subsequently, time spent by a user in redefining notes for the BI report based on the changes in fact table may be minimized thereby ensuring convenience to the user. In one example, the report generation module 126 may be configured to store information pertaining to the report generation in the report generation data 136.

FIG. 1(*b*) illustrates a representation of a Reference Indicators for Report Notes model (also referred to as RIRN model) implemented by a business intelligence (BI) system 102, according to one embodiment of the present subject matter. Further, the representation is provided for a better clarity of the subject matter and should not be considered as limiting. Also, the RIRN model may be represented using various other forms of representation as would be appreciated by a person skilled in the art. As mentioned in the description of FIG. 1(*a*), the BI system 102 may receive a plurality of report parameters, such as note and indicator parameters, grain parameters, and report note mapping parameters. In one implementation, the report parameters may be provided by a user interface(s) 140.

The report parameters may be provided to a database 106, where the report parameters may be tabulated in a plurality of database tables, such as a BI report table, a note and indicator table, a grain table, and a BI report note table.

In one implementation, the data available in the plurality of database tables may be transformed in a format desirable by an organization by a transformation module 124. For example, the data from the database tables may be transformed by Extraction, Transformation, and Loading (ETL) process. After the ETL process, the data may be provided to a data warehouse 142 in form of fact tables and dimension tables. In another implementation, the fact table may be surrounded by a plurality of dimension tables in a star schema configuration. Further, the fact table may be populated based on predefined metadata rules.

Continuing with the present implementation, the data from the data warehouse may be provided for the generation of the BI reports based on report parameters provided by an organization. Therefore, based on the report parameters, BI reports with navigable reference indicators may be generated.

FIG. 1(*c*) illustrates a representation of a plurality of database tables, according to one embodiment of the present subject matter. Further, as would be appreciated by a person skilled in the art, the representation is provided for a better clarity of the subject matter and should not be considered as limiting.

As mentioned previously, the report parameters received by the BI system 102 may be stored and tabulated in a database in form of a plurality of database tables. In one implementation, the plurality of database tables may include, but are not limited to a BI report table, a note and indicator table, a grain table, and a BI report note table.

Further, as shown in FIG. 1(*c*), the BI report table may include, but are not limited to a plurality of columns for details pertaining to a plurality of BI reports. In one implementation, the BI report may include a unique ID, name, description, and status corresponding to each of the plurality of BI reports.

Similarly, the note and indicator table may include various details pertaining to a plurality of notes and their corresponding navigable reference indicators. For example, in one implementation, the notes and indicator table may include a unique ID, and text corresponding to each of the plurality of notes and the navigable reference indicators.

Further, the grain table may include various details pertaining to master or grain types to be implemented in the plurality of BI reports. In one implementation, the grain table may include a unique ID and description of the corresponding masters or grain types. Based on the grain type selected, data in a fact table may be populated. Further, in one implementation, the notes and the navigable reference indicators may be defined based on the selected grain type for a BI report.

Furthermore, the report note mapping table may include unique ID allotted to the plurality of BI reports, grain types, grain codes, and position or column corresponding to a plurality of notes. In other words, the plurality of notes may be mapped with respect to the details provided for generation of BI reports. In addition, effective start date and effective end date for each of the plurality of navigable reference indicators provided with different values, for referring to the plurality of the notes in the BI report may also be defined in the report note mapping table.

FIG. 1(*d*) illustrates a representation of a fact table and a plurality of dimension tables in star schema configuration in a business intelligence (BI) system 102, according to one embodiment of the present subject matter. Further, as would be appreciated by a person skilled in the art, the representation is provided for a better clarity of the subject matter and should not be considered as limiting.

In one implementation, data may be populated in the fact table based on predefined metadata rules. Further, the plurality of dimension tables may include a dimension table for notes, i.e. Notes_Dim. Also, a filter may be provided in the Notes_Dim to filter the data pertaining to notes corresponding to different columns and therefore, providing different dimension tables for notes corresponding to each column, i.e. Notes_$C_1$_Dim, Notes_$C_2$_Dim . . . Notes_$C_3$_Dim. As would be gathered, the Notes_$C_1$_Dim, Notes_$C_2$_Dim . . . Notes_$C_3$_Dim are subsets of Notes_Dim. In a further implementation, a dimension table for grain, i.e. Report_Grain_Dim may also be provided. Furthermore, other dimension tables may also be provided based on the requirements of an organization.

FIG. 1(e) illustrates a representation of Business intelligence report with navigable reference indicators, according to one embodiment of the present subject matter. Further, as would be appreciated by a person skilled in the art, the representation is provided for a better clarity of the subject matter and should not be considered as limiting.

The BI report may include navigable reference indicators in the form of a forward link and a backward link. In one implementation, the BI report includes a plurality of values with forward links referring to the corresponding notes. For example, a forward link with text "a/" is provided with a value "P0". When a reader clicks on the forward link "a/", the forward link may refer the reader to a note corresponding to the text "a/" in notes section. Similarly, to trace back the value "P0", a backward link or a return link "[1]" is provided with the note. The return link "[1]" may refer the reader back to the value "P0".

In another case, two values "BCD" and "160.00" are provided with forward links "b/1" and "b/2" as navigable reference indicators, which may refer the reader to a common note "b/". Further, return links "[1]" and "[2]" are provided with the common note "b/". The return link "[1]" may refer the reader to the value "BCD". Similarly, the return link "[2]" may refer the reader to the value "160.00".

Figure 2:
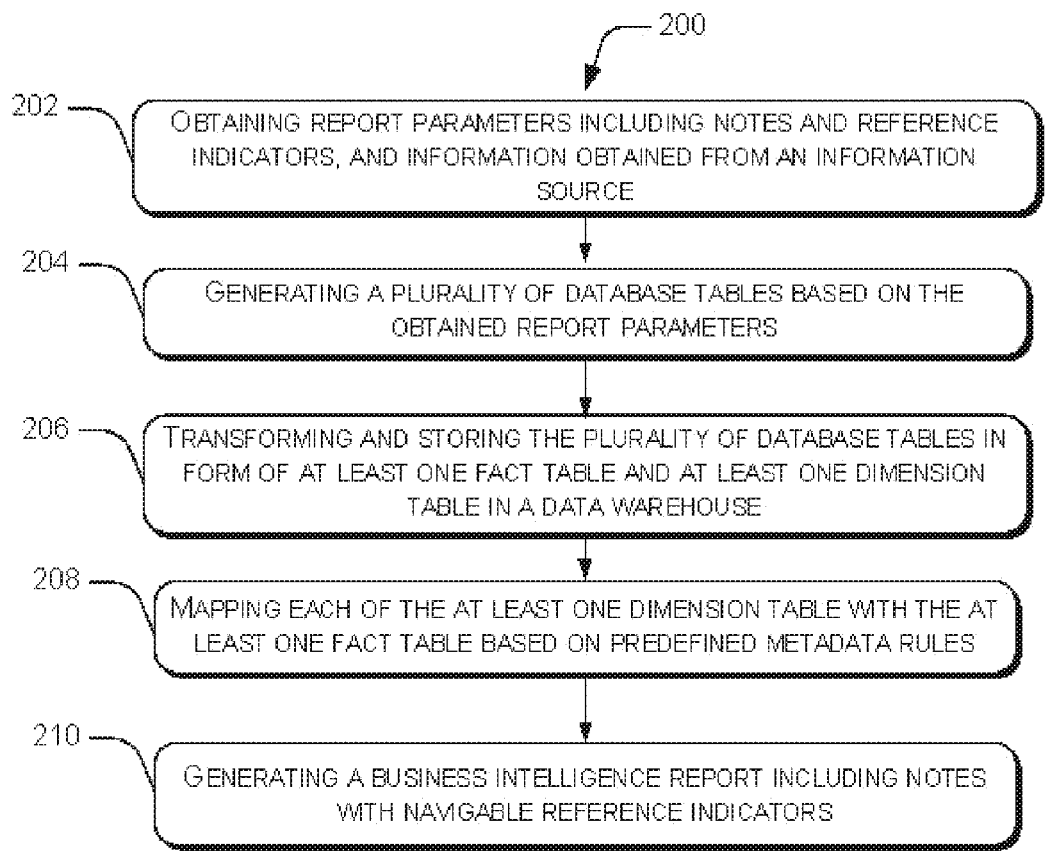
FIG. 2 illustrates a method for generation of business intelligence reports with navigable reference indicators, in accordance with an embodiment of the present subject matter.

FIG. 2 illustrates a method 200 for generating business intelligence reports with navigable reference indicators, according to one embodiment of the present subject matter. The method 200 may be implemented in a variety of computing systems in several different ways. For example, the method 200, described herein, may be implemented using a Business Intelligence (BI) system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the BI system 102, the description may be extended to other systems as well.

Generally, Business Intelligence reports may include a large number of pages or sheets. Further, various values included in the BI report may have a plurality of notes for providing additional information or description pertaining to the values. The notes are generally provided at the end of the report or on the same page where the value is provided. It becomes inconvenient for a reader to move back and forth between main text and notes section of the BI report to refer to the corresponding note. The BI system 102 generating BI reports with navigable reference indicators ensures a time saving and convenient method for referring to the plurality of notes corresponding to different values included in the BI report.

At block 202, report parameters may be obtained from an administrator associated with an organization. Further, the administrator may provide the report parameters to the BI system 102 through a user interface(s). In addition, information from an information source may be provided to the BI system 102. In one implementation, the information source may include different sources, such as various software applications, external databases, and online portals. Further, the report parameters may include, but are not limited to notes and indicator parameters, grain parameters, and report note mapping parameters.

In one implementation, the notes and indicator parameters may include, but are not limited to a unique ID for each note, a unique ID for each navigable reference indicator associated with different notes, note text for describing a value in detail, text for each reference note, and language of the text. Similarly, the grain parameters may include, but are not limited to type of grain for generating the BI report, and a unique ID for each grain type. As mentioned earlier, grain is a level of dimension based on which, data in the BI report may be provided. Further, in one implementation, the notes and indicator parameters may be defined based on the grain type selected for generating a BI report.

Furthermore, report note mapping parameters assist in mapping a plurality of notes with a plurality of BI reports. In one implementation, the report note mapping parameters define a corresponding BI report, grain type, grain code, and position for a plurality of notes. In an example, a parameter module 120 of the BI system 102 may be configured to receive the report parameters from an administrator associated with an organization.

At block 204, after providing the report parameters to the BI system 102, a plurality of database tables may be generated based on the obtained report parameters. In one implementation, the plurality of database tables may include, but are not limited to a BI report table, a notes and indicator table, a grain table, and a report notes table.

The BI report table may include details pertaining to a plurality of BI reports. For example, the BI report table may includes description, status, and technical field of the BI reports. In other words, the BI report table may be understood as master table of the plurality of BI reports.

Further, the notes and indicator table may include details pertaining to the notes and indicator parameters. For example, the notes and indicator table may include text and unique ID for each of a plurality of notes and a plurality of navigable reference indicators which may be implemented in the plurality of BI reports. Further, in one implementation, the unique ID allotted to each note as the report parameters, may be considered as primary key for the notes and indicator table. Furthermore, the grain table may include details pertaining to the grain parameters provided by the administrator of the organization. In one implementation, the unique ID allotted to each grain as the grain parameters, may be considered as primary key for the grain table.

In another implementation, the report note mapping table may include details pertaining to the report note mapping parameters. For example, the report note mapping table may include the unique ID allotted to the plurality of BI reports, grain types, grain codes, and position or column corresponding to the plurality of notes. In other words, the plurality of notes may be mapped with respect to the details provided for generation of BI reports. In addition, effective start date and effective end date for each of the plurality of navigable reference indicators provided with different values, for referring to the plurality of the notes in a BI report may also be defined. Therefore, a value may be provided with a navigable reference indicator for a predefined time period based on the user preference. In an example, a tabulation module 122 of the BI system 102 may be configured to generate a plurality of database tables based on the obtained report parameters.

At block 206, data available in the form of the plurality of database table may be transformed in different formats based on the requirements of different organizations. In one implementation, Extraction, Transformation, and Loading (hereinafter referred to as ETL) process may be selected to transform the data in the plurality of database tables. In one implementation, after the ETL process, the data from the plurality of the database tables may be provided to the data warehouse in form of at least one fact table and at least one dimension tables. Further, values in the at least one fact table and the at least one dimension table may be provided based on predefined metadata rules. In an example, a transformation module 124 of the BI system 102 may be configured to transform the data available in the database in form of at least one fact table and at least one dimension table in the data warehouse.

In one implementation, the fact table and the at least one dimension table stored in a data warehouse may be arranged in a star schema configuration. Further, the at least one dimension table may include a dimension table for notes to be implemented in a plurality of BI reports. Also, a filter may be provided in the notes dimension table to filter the data pertaining to notes corresponding to different columns and therefore, providing different dimension tables for notes corresponding to each column. In a further implementation, a dimension table for grain may also be provided. At block 208, the at least one dimension table may be mapped with the at least one fact table based on predefined metadata rules. In an example, a transformation module 124 of the BI system 102 may be configured to map the at least one dimension table with the at least one fact table.

At block 210, a BI report including notes with navigable reference indicators may be generated based on the mapping of the at least one fact table and the at least one dimension table in the data warehouse. The BI report may include a plurality of navigable reference indicators associated with different notes provided with a plurality of values provided in the BI report. In one implementation, the navigable reference indicators may be provided as at least one of a super-script text, a sub-script text, and a normal text.

In another implementation, the navigable reference indicators may be provided as a forward link and a backward link between two or more sections of the BI report. In one implementation, the forward link may be provided as a URL link to refer a reader to a corresponding note in notes section. Similarly, at least one backward link or return link may also be provided with each of the plurality of notes in the notes section. Therefore, by providing forward links with different values in the BI report, and backward links in the notes section minimizes the time spent in referring the note. Further, the inconvenience caused in tracing back the corresponding value may also be avoided.

As mentioned previously, notes and navigable reference indicators are defined on the basis of grain of a BI report. Therefore, in case of any change in the data contained in the at least one fact table, navigable reference indicators provided in the existing BI report may automatically get updated and repositioned. Subsequently, time spent by a user in redefining notes for a BI report based on the changes in fact table may be minimized thereby ensuring convenience to the user. In an example, a report generation module 126 of the BI system 102 may be configured to generate the BI reports with navigable reference indicators.

Although implementations of a method for generating business intelligence reports with navigable reference indicators have been described in language specific to structural features and/or methods, it is to be understood that the present subject matter is not necessarily limited to the specific features or methods described.

I claim:

1. A computer implemented method for generating business intelligence reports with navigable reference indicators, the method comprising:
    obtaining information from an information source for providing in a business intelligence report;
    obtaining report parameters through a user interface, wherein the report parameters include at least notes and indicator parameters, wherein the notes and indicator parameters indicate a plurality of navigable reference indicators to be included in the business intelligence report;
    mapping the notes and indicator parameters with the obtained information, wherein the mapping further comprises generating database tables based on the report parameters, the database tables comprising at least one of a business intelligence report table, a notes and indicator table, a grain table, and a report note mapping table; and
    generating, based on the mapping, the business intelligence report with the plurality of navigable reference indicators, wherein the plurality of navigable reference indicators provide a forward and backward link between two or more sections of the business intelligence report.

2. The method as claimed in claim 1, wherein the notes and indicator parameters are based on a grain defined for the business intelligence report.

3. The method as claimed in claim 1, wherein the notes and indicator parameters include at least one of a unique ID for each note, a unique ID for each navigable reference indicator associated with different notes, note text, indicator text, and language of the text.

4. The method as claimed in claim 1, wherein the report parameters further include grain parameters and report note mapping parameters.

5. The method as claimed in claim 4, wherein the grain parameters are indicative of a grain defined for the business intelligence report.

6. The method as claimed in claim 1, wherein the mapping further comprises obtaining at least one dimension table corresponding to the report parameters, based on the database tables.

7. The method as claimed in claim 6, wherein the at least one dimension table is obtained based on an extraction, transformation, and loading (ETL) process.

8. The method as claimed in claim 1, wherein the mapping further comprises populating at least one fact table with the information obtained from the information source, the populating being based on the report parameters.

9. A business intelligence system for generation of business intelligence reports with navigable reference indicators, the business intelligence system comprising:
   a processor; and
   a memory coupled to the processor, the memory comprising:
      a parameter module configured to, obtain information from an information source, wherein the information is provided in a business intelligence report; and
      obtain report parameters, wherein the report parameters include at least notes and indicator parameters, the notes and indicator parameters indicative of a plurality of navigable reference indicators to be included in the business intelligence report, and wherein the notes and indicator parameters are based on a grain defined for the business intelligence report;
      a transformation module configured to map the notes and indicator parameters with the obtained information, wherein the transformation module is further configured to generate database tables based on the report parameters, wherein the database tables comprises at least one of a business intelligence report table, a notes and indicator table, a grain table, and a report note mapping table; and
      a report generation module configured to generate, based on the mapping, the business intelligence report with the plurality of navigable reference indicators, wherein the plurality of navigable reference indicators provide a forward and backward link between two or more sections of the business intelligence report.

10. The business intelligence system as claimed in claim 9, wherein the transformation module is further configured to obtain at least one dimension table corresponding to the report parameters based on the database tables.

11. The business intelligence system as claimed in claim 10, wherein the transformation module is further configured to obtain the at least one dimension table based on extraction, transformation, and loading (ETL) process.

12. The business intelligence system as claimed in claim 9, wherein the transformation module is further configured to populate the at least one fact table with the information obtained from the information source, the populating being based on the report parameters.

13. A non-transitory computer-readable medium having embodied thereon a computer program for executing a method comprising:
   obtaining information from an information source for providing in a business intelligence report;
   obtaining report parameters through a user interface, wherein the report parameters include at least notes and indicator parameters, the notes and indicator parameters being based on a grain defined for the business intelligence report and the notes and indicator parameters being indicative of a plurality of navigable reference indicators to be included in the business intelligence report;
   mapping the notes and indicator parameters with the obtained information, wherein the mapping further comprises generating database tables based on the report parameters, the database tables comprising at least one of a business intelligence report table, a notes and indicator table, a grain table, and a report note mapping table; and
   generating, based on the mapping, the business intelligence report with the plurality of navigable reference indicators, wherein the plurality of navigable reference indicators provides a forward and backward link between two or more sections of the business intelligence report.

* * * * *